(12) United States Patent
Turk et al.

(10) Patent No.: US 7,609,647 B2
(45) Date of Patent: Oct. 27, 2009

(54) METHOD AND APPARATUS FOR NETWORK CONFIGURATION VALIDATION

(75) Inventors: Doughan A. Turk, Toronto (CA); Ronald Mark Seguin, Ottawa (CA); Mohamad Mtairek, Ottawa (CA)

(73) Assignee: BCE Inc., Verdun, Quebec (CA)

( * ) Notice: Subject to any disclaimer, the term of this patent is extended or adjusted under 35 U.S.C. 154(b) by 946 days.

(21) Appl. No.: 10/843,320

(22) Filed: May 12, 2004

(65) Prior Publication Data

US 2005/0254438 A1 Nov. 17, 2005

(51) Int. Cl.
*H04J 1/16* (2006.01)
*H04L 12/56* (2006.01)
(52) U.S. Cl. .......................... 370/252; 370/254; 370/419
(58) Field of Classification Search .................. 370/252, 370/254–258, 278, 282, 419; 709/220, 221, 709/224, 225, 226
See application file for complete search history.

(56) References Cited

U.S. PATENT DOCUMENTS

| | | | | |
|---|---|---|---|---|
| 6,012,088 A | | 1/2000 | Li et al. ....................... 709/220 |
| 6,128,730 A | * | 10/2000 | Levine ............................ 713/1 |
| 6,760,761 B1 | * | 7/2004 | Sciacca ....................... 709/220 |
| 2002/0078382 A1 | | 6/2002 | Sheikh et al. ................ 709/224 |
| 2003/0043820 A1 | | 3/2003 | Goringe et al. ............. 370/255 |
| 2005/0015471 A1 | * | 1/2005 | Zhang et al. ................ 709/221 |

\* cited by examiner

*Primary Examiner*—John Pezzlo

(57) ABSTRACT

The accuracy of configuration data within routers of a network are critical in today's networks for security of the network, efficient operating of the network and to ensure corporate requirements, such as redundancy, are met. Since configuration data is typically entered and modified manually by technicians, considerable human errors occur. A configuration validation system provides an automated capability to ensure accuracy within the routers of a network. In this system, the validation is completed utilizing dynamically set conditions based upon the utilization of the router and a characteristic of the router, such as the model type. The utilization of the router includes the services that are supported by the router and the position of the router within the network, both of these criteria of the router having specific configuration requirements. The utilization of the routers can be detected by look-up within an inventory database and/or analysing the applicable configuration data. During the validation process, any discrepancies can be logged. At completion, these discrepancies can be listed within a report of configuration problems to be fixed or be automatically sent to the routers within the network to correct the configuration data.

34 Claims, 7 Drawing Sheets

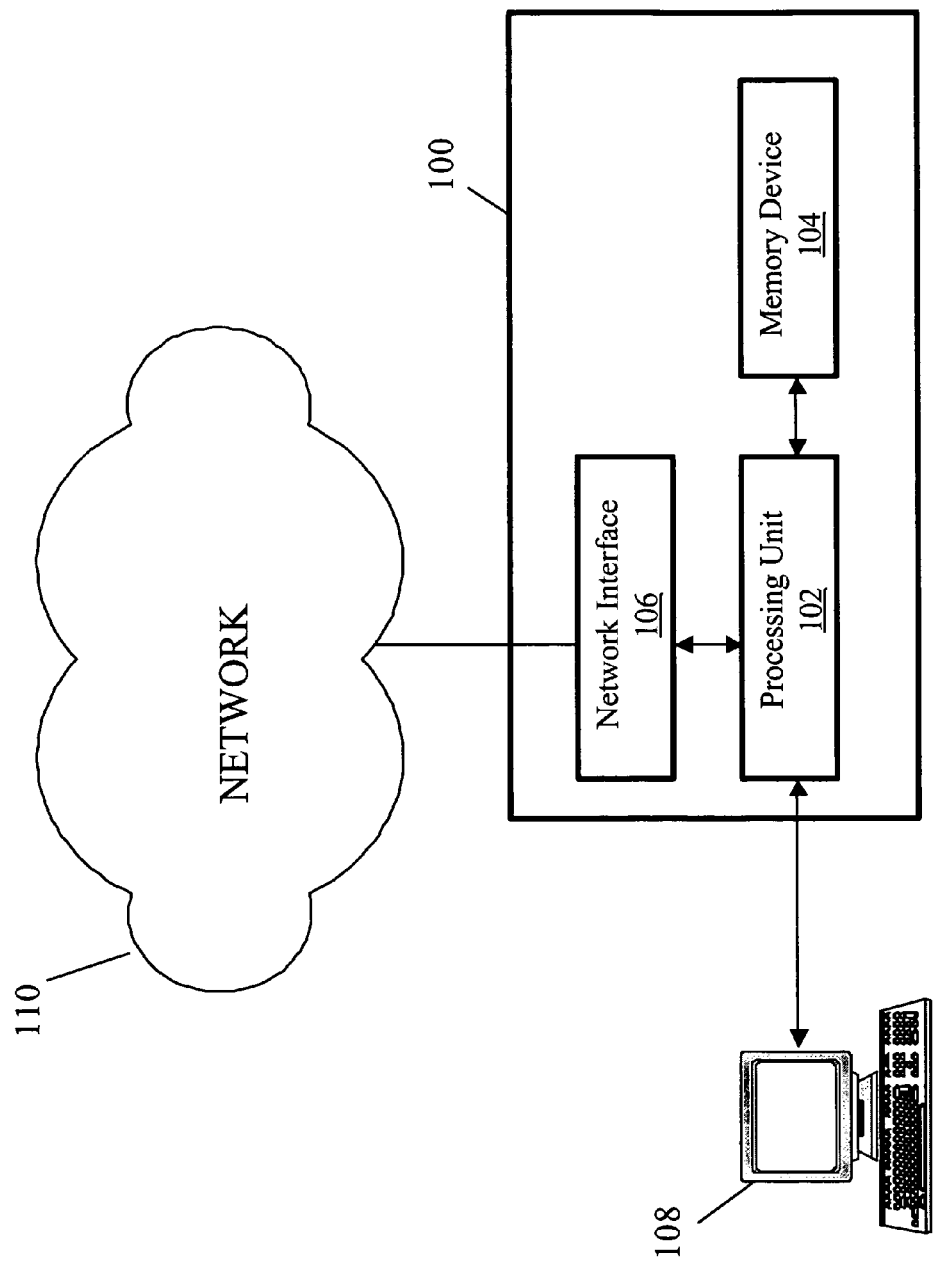

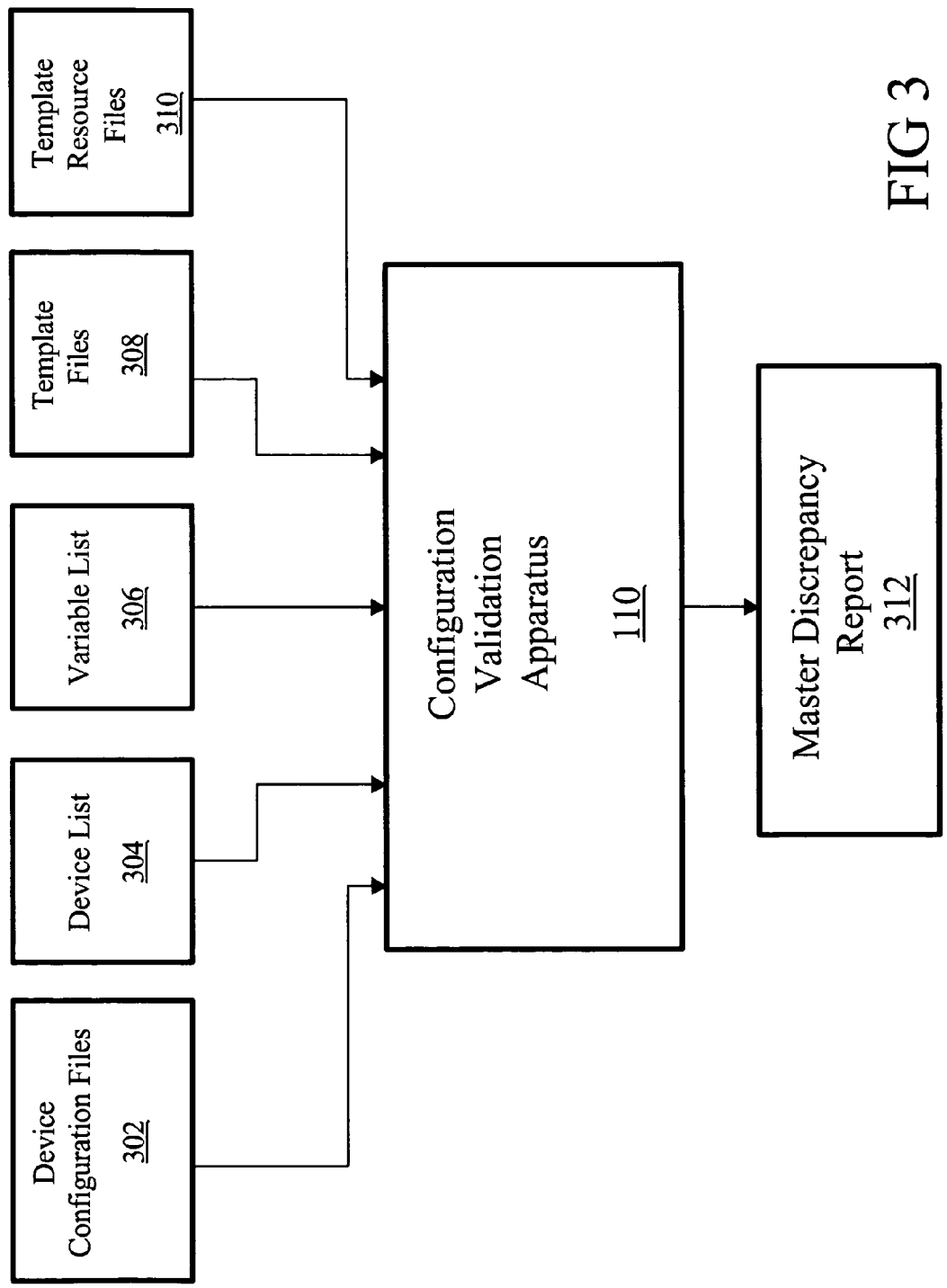

METHOD AND APPARATUS FOR NETWORK CONFIGURATION VALIDATION

FIELD OF THE INVENTION

The present invention relates generally to communication networks and more specifically to a method and apparatus for configuration validation of devices within communication networks.

BACKGROUND OF THE INVENTION

Communication networks are comprised of large numbers of interconnected devices, such as routers. Devices can be configured within the network to process communication messages, to interface with their neighbours and to host services. There are various companies that produce network devices and each company has a variety of models with an array of features, the number of models increasing on a regular basis. The network architectures used within these networks today can be complex with considerable security features and options to ensure high consistency, such as redundancy. The services run on the network devices for customers, such as virtual private network services, are growing in number, in security and in quality of service.

These large number of network device models, architectures and potential services create a very complex environment of configurations within the network devices. These complexities are exponentially increased even further when considering the general need to consistently adjust the network, for example due to network expansions and/or security breaches. When a new network device is added to the network, configurations of numerous network devices must be adjusted. For instance, this is similar in cases that a network device is removed from the network, a source of a worm attack is located and must be isolated or a new service is launched for a particular customer or group of customers. The configurations of the network devices are regularly changing.

The setting up of the configurations for a network device is typically done based upon a template for the device's model that is adjusted for the particular device manually by a network technician. As the need arises, the network technician further adjusts the network device configuration to accommodate desired changes within the network (addition/removal of devices, react to worm attacks etc.).

The accuracy of the configurations set by, the network technicians is critically important to the proper operation, security and efficiency of the network. With incorrect configurations, some potential problems include messages getting improperly routed, security lapses that hackers could exploit and communications being routed via non-ideal links that reflect an incorrect cost and/or bandwidth accounting of links. These problems easily occur due to the manual nature that these configurations are generated and input to the network devices. In all, the configurations are generally complex, critically important and, if maintained in ideal states, could increase the network's bandwidth while increasing quality of service for the customer. Hence, it is of high importance to ensure that network device configurations remain accurate.

One solution for ensuring the configurations within the network devices are accurate has been developed by Cisco Systems of San Jose, Calif. called Cisco NetSys Baseliner. In this software, Cisco allows for a static configuration validation of the network devices of the network. These validations are based on a direct comparison between the network devices' configurations and a preset ideal for the particular device. This software further allows pictorial images of the network architecture to be produced and potentially for a network technician to view the configuration data of a particular network device.

The Cisco NetSys Baseliner does not detect the services being run on the network devices that are being compared and further does not dynamically adjust the ideal settings for the network device based upon its specific utilization. Although the software helps to manage the network by providing a limited validation tool and a graphical user interface for viewing the network architecture, the software has limited use as a complete network configuration validation tool. There are considerable configuration elements that must be reviewed that are unique to specific network elements based upon their model, position within the network and/or the services running on them.

SUMMARY OF INVENTION

The present invention, according to a first broad aspect, is an apparatus for validation of network device configuration data within a network. The apparatus comprises a first interface operable to receive configuration data from a plurality of network devices within the network, a processing unit and a second interface operable to output the results of the processing unit. The processing unit is operable to validate the configuration data for each of the network devices utilizing dynamically set conditions based upon the utilization of the network device and at least one characteristic of the network device. In some implementations, the dynamically set conditions comprise template data defined based upon the utilization of the network device and the at least one characteristic of the network device; this template data potentially stored within a memory unit further within the apparatus.

In some embodiments of the present invention, the first interface extracts configuration data from a plurality of network devices within the network. In others, the first interface retrieves from memory configuration data for a plurality of network devices within the network. In order to detect either the data related to the utilization of the network device or the at least one characteristic of the network device, in some embodiments, the processing unit extracts information from a network device database and/or analyses the configuration data of the particular network device.

In particular embodiments of the present invention, the utilization of the network device comprises one or both of the set of services being run on the network device and the position of the network device in the network. The set of services could include no services, a Virtual Private Network (VPN) service, a dial-up Internet service and/or a high speed Internet service. The position of the network device could in some implementations include a border position, a core position and a distribution position. The at least one characteristic could be a model identifier of the network device.

In some implementations of the present invention, the second interface is a discrepancy report interface that generates a report of discrepancies in the configuration data of the network devices located by the processing unit during the validation of the configuration data. In another implementation, the second interface is a discrepancy repair interface that sends one or more reconfiguration commands to one or more of the network devices in order to correct discrepancies in the configuration data of the network devices located by the processing unit during the validation of the configuration data. After sending the reconfiguration commands, the processing unit in some embodiments re-validates the configuration data for a set of the network devices. This set of network devices could be all of the network devices or a subset, such as the network devices in which at least one discrepancy was found.

According to a second broad aspect, the present invention is a method for validating network device configuration data within a network. The method includes receiving configuration data from a plurality of network devices within the network; validating the configuration data for each of the network devices utilizing dynamically set conditions based upon the utilization of the network device and at least one characteristic of the network device; and outputting the results of the step of validating the configuration data.

The present invention, according to a third broad aspect, is a configuration validation system operable to be coupled to a plurality of interconnected network devices, each network device comprising corresponding configuration data. The system includes configuration logic and outputting logic. The configuration validation logic operable to validate the configuration data for each of the network devices utilizing dynamically set conditions based upon the utilization of the network device and at least one characteristic of the network device. The outputting logic operable to output the results of the configuration validation logic.

According to a fourth broad aspect, the present invention is an apparatus including means for receiving configuration data from a plurality of network devices within the network; means for validating the configuration data for each of the network devices utilizing dynamically set conditions based upon the utilization of the network device and at least one characteristic of the network device; and means for outputting the results of the means for validating.

BRIEF DESCRIPTION OF THE DRAWINGS

Embodiments of the present invention are described with reference to the following figures, in which:

FIG. 1 is a block diagram illustrating a network configuration validation apparatus according to one embodiment of the present invention;

FIG. 3 is a logical block diagram illustrating the components that are input and output from the configuration validation apparatus of FIG. 1 according to one embodiment of the present invention;

DETAILED DESCRIPTION OF THE PREFERRED EMBODIMENT

Figure 2A:
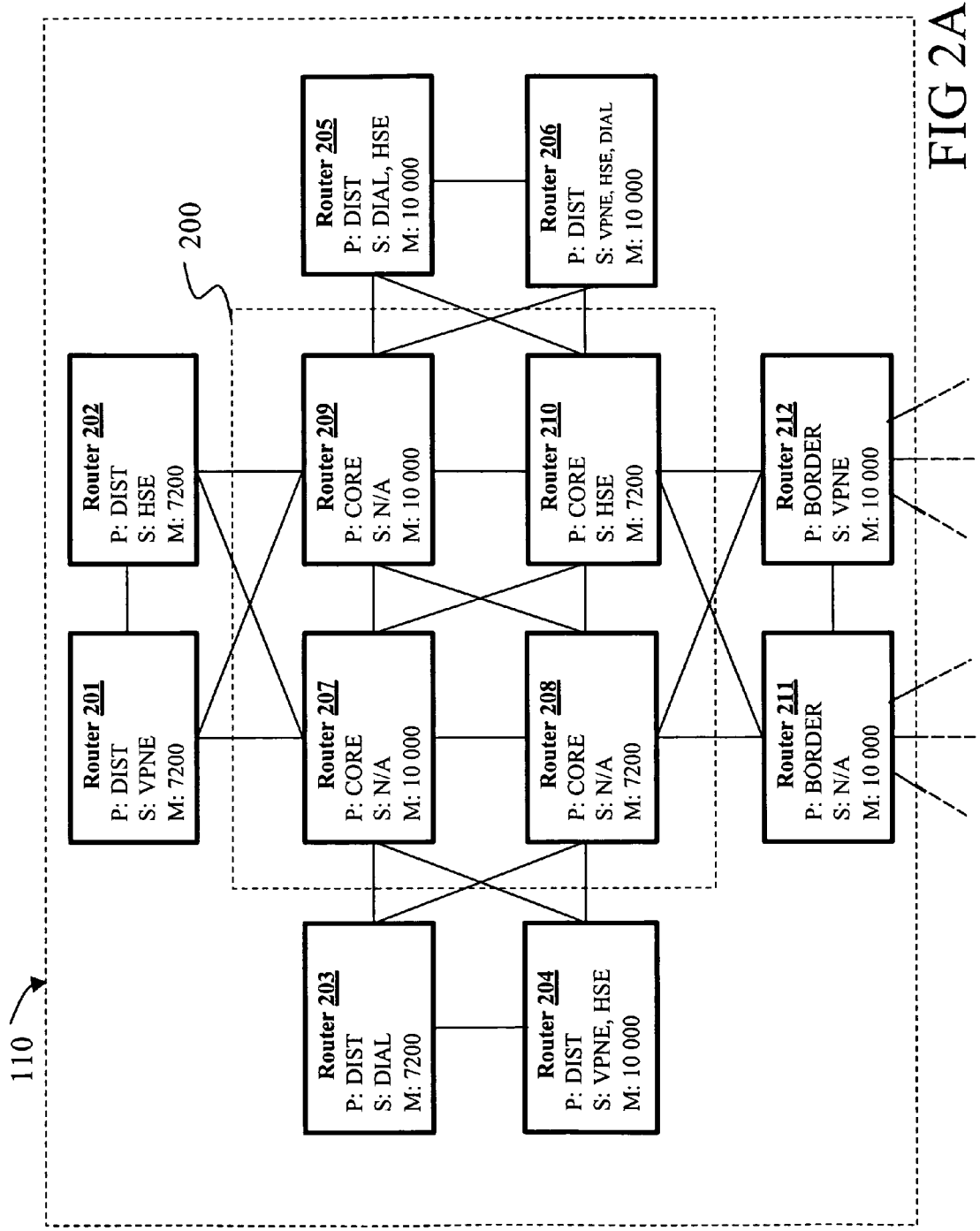
FIGS. 2A and 2B are sample networks that could be utilized with the network configuration validation apparatus of FIG. 1.

FIG. 1 is a block diagram illustrating a network configuration validation apparatus 100 according to one embodiment of the present invention. As depicted, the apparatus 100 comprises a processing unit 102 coupled to a memory device 104 and further coupled to a network interface 106. In FIG. 1, the processing unit 102 is further coupled to a computer 108 while the network interface 106 is coupled to a network 110.

In this embodiment of the present invention, the processing unit 102 operates to support network configuration validation logic as will be described in more detail below. It should be understood that although this logic is described as a software program, this logic could be in the form of software, firmware, hardware or any combination thereof. Although depicted as a single processing unit, it should be understood that the processing unit could be a plurality of physical devices.

The memory device 104, in this embodiment, operates to store the configuration template data that will be utilized by the network configuration validation logic and potentially store configuration data corresponding to network devices within the network 110 after such data is extracted. It should be understood that this memory device 104 could take numerous forms including, but not limited to, RAM, Flash, a physical hard drive or any combination thereof. Further it should be understood that such a memory device could reside outside of the apparatus 100.

The computer 108 can be considered an outputting device for information generated by the processing unit 102, such as displaying a master list of discrepancies within the configurations of the network devices of the network 110 as will be described below. In alternative embodiments, the outputting device could take a different form. For instance, the outputting device could be the network interface 106 in the case that the outputs of the processing unit 102 are signals for reconfiguring the network devices of network 110 as will also be described in more detail herein below.

The network interface 106 could be based upon a number of standards including Ethernet. The key is to allow the processing unit 102 to interact with the network devices of the network 110 such that the configuration data for these network devices can be analysed by the processing unit 102. Therefore, although shown in FIG. 1 as a separate physical entity from network 110, apparatus 100 could be integrated within the network 110, for instance within one of the network devices of network 110.

Figure 2B:
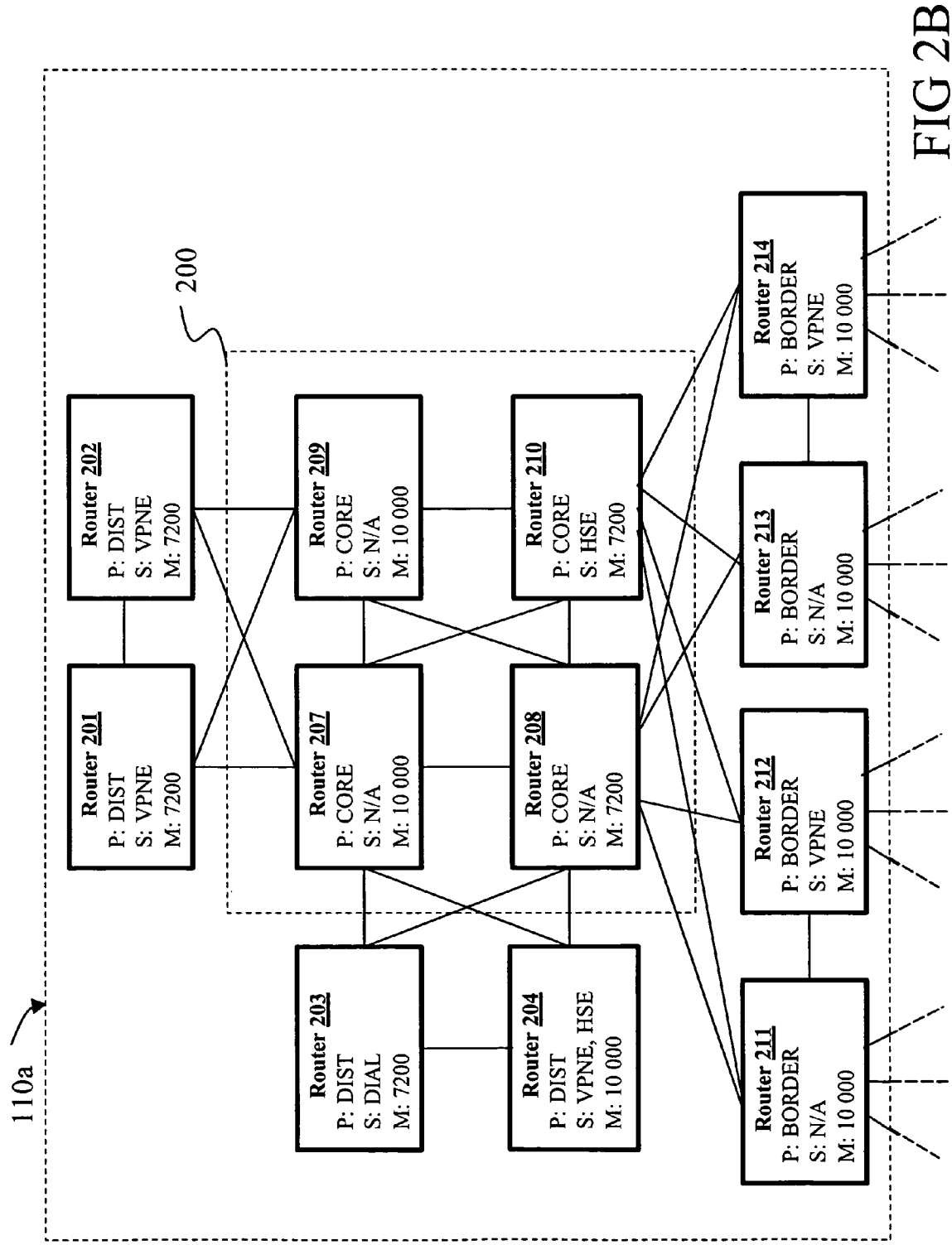

FIGS. 2A and 2B illustrate two sample networks that could comprise the network 110 of FIG. 1. In FIG. 2A, the network 110 comprises twelve routers 201-212 interconnected to provide a selection of services. Each of these routers 201-212 is assigned a particular Internet Protocol (IP) address; for instance, router 201 could be assigned IP address 1.1.1.1. Each of the routers 201-212 is of a particular position within the network 110, has a particular set of services running on it and is of a particular product model. As shown in FIG. 2A, router 201 for example is a model 7200 router produced by Cisco Systems, is positioned as a distribution router and has the Virtual Private Network Edition (VPNE) service running on it.

In the sample network of FIG. 2A, there are three positions for the routers 201-212, these being border, core and distribution. As shown, routers 211 and 212 are border routers which are routers that connect with at least one network device of another network, potentially another network with a different network service provider. Routers 210 through 206 are distribution routers (also known commonly as access routers) which are routers that are specifically configured for distributing services to end customers. The distribution routers in this network aggregate most access connections into the core as well as provide data manipulation such as access-lists. In FIG. 2A, except for two exceptions, the distribution routers are the only routers that are supporting services for customers though, in alternative embodiments, border and core routers could support such services. Routers 207 through 210 are core routers which in the simplified network design of FIG. 2A are the highest level of aggregation within the network and typically connect Points of Presence (PoPs) within an internetwork from a Layer 3 perspective. In this case, the core routers 207-210 comprise a core infrastructure 200 that all distribution and border routers are coupled. The core infrastructure is focused on processing packets at a high rate, rather than other processing such as services.

This core infrastructure 200 could comprise many more than four routers and network 110 could comprise significantly more distribution and border routers than are depicted. It should be understood that a network could have different configuration positions for routers within a network and different names for these positions and the present invention should not be limited to networks with the above three defined positions.

As shown, there are a number of services that could operate within each of the routers 201-212 including the Virtual Private Network Edition (VPNE) service, the High Speed Edition (HSE) and the dial-up (DIAL) service. In this example, the VPNE service allows customers to connect to the router using VPN technology, the HSE service allows customers to connect to the router using DSL technology and the DIAL service allows customers to connect to the router with an ISDN connection. It should be understood that the services on the routers could be different than those indicated and the present invention should not be limited to these specific services. In FIG. 2A, routers 201, 204, 206 and 212 support the VPNE service; routers 202, 204, 205, 206 and 210 support the HSE service; routers 203, 205 and 206 support the DIAL service; and routers 207, 208, 209 and 211 support no customer services. It should be recognized that each router within network 110 could be configured to support zero, one or more services. In one embodiment, not shown, only distribution routers support services, with core and border routers supporting no services. In this embodiment, the border routers would continue to support transit and pairing which is well known for border routers.

There are various models for the routers 201-212 within the network 110. For illustration, all routers are either model 7200 routers or model 10000 routers, both produced by Cisco Systems. It should be understood that a network could have one, two or more different router models produced by one or more different companies.

The network architecture of FIG. 2A is designed to ensure redundancy. Each router is paired to another router of the same position while each distribution and border router is coupled to two core routers. In this design, to ensure real physical redundancy, each of the two core routers that a distribution or border router is coupled must be in a physically different location than the other of the two core routers. As shown, distribution routers 201 and 202 are coupled to each other and each further coupled to core routers 207 and 209; distribution routers 203 and 204 are coupled to each other and each further coupled to core routers 207 and 208; and distribution routers 205 and 206 are coupled to each other and each further coupled to core routers 209 and 210. Border routers 211 and 212 are coupled to each other and each further coupled to core routers 208 and 210. Each of the core routers 207-210 are coupled to each of the other core routers 207-210. It should be understood that other configuration designs could be used to connect the routers of network 110 and the design illustrated is only one example.

FIG. 2B illustrates a modified version of the sample network depicted in FIG. 2A in which distribution routers 205 and 206 have been removed and new border routers 213 and 214 have been added. As illustrated, border routers 213 and 214 are coupled to each other and each further coupled to core routers 208 and 210.

It should be noted that one skilled in the art could contemplate a different position classification for the routers, a different set of router models and/or a different combination of potential services. The specific positions, models and services provided in FIGS. 2A and 2B are meant as examples only and should not be used to limit the scope of the present invention. The networks of FIGS. 2A and 2B will be utilized herein below as examples of networks for which the present invention could operate.

FIG. 3 is a logical block diagram illustrating the components that are input and output from the configuration validation apparatus 100 of FIG. 1 according to one embodiment of the present invention. As shown, the inputs to the apparatus 100 for this embodiment include device configuration files 302, a device list 304, a variable list 306, template files 308 and template resource files 310. In this embodiment, the device configuration files 302 represent the configuration data for a plurality of network devices and the device list 304 indicates the set of network devices in which configuration validation is requested. This device list 304 could include names for the specific network devices or alternatively their IP addresses. The variable list 306 indicates the set of variables within the device configuration files 302 that are to be compared with the template files 308 (for example: bgp, snmp, etc.). Effectively, the variable list 306 filters the commands within the configuration data to a list of commands that the user would like to validate.

The template files 308, in one embodiment, include system templates, security templates, Border Gate Protocol (BGP) templates, Quality of Service (QoS) templates, NetFlow templates and Open Shortest Path First (OSPF) templates, the dynamic use of which will be described herein below in more detail. The template resource files 310 comprise a variety of data that could be required by one or more of the template files 308; for instance IP Community lists, route map files and access list files. The output of the apparatus 100, in this case, is a master discrepancy report 312 that includes a list of all discrepancies that have been found by comparing the variables of variable list 306 within the device configuration files 302 of those network devices within the device list 304 to the appropriate dynamically adjusted template files 308.

It should be understood by one skilled in the art that the device list 304 could be removed or alternatively list the devices within the network not to have their configurations validated (effectively a safe configuration list). Further, variable list 306 could be removed or similarly simply provide a list of safe variables that do not have to be validated. Yet further, although the template files are split based upon functional area, a complete master template could be produced that could operate for all routers, as long as the portions of the template could be dynamically selected for use. The template resource files 310 could further be integrated with the templates files 308, but the advantage of separating this information is that it is easier to modify/correct such information if it is centralized, especially if the particular information may need to be accessed by various template files 308.

Figure 4A:
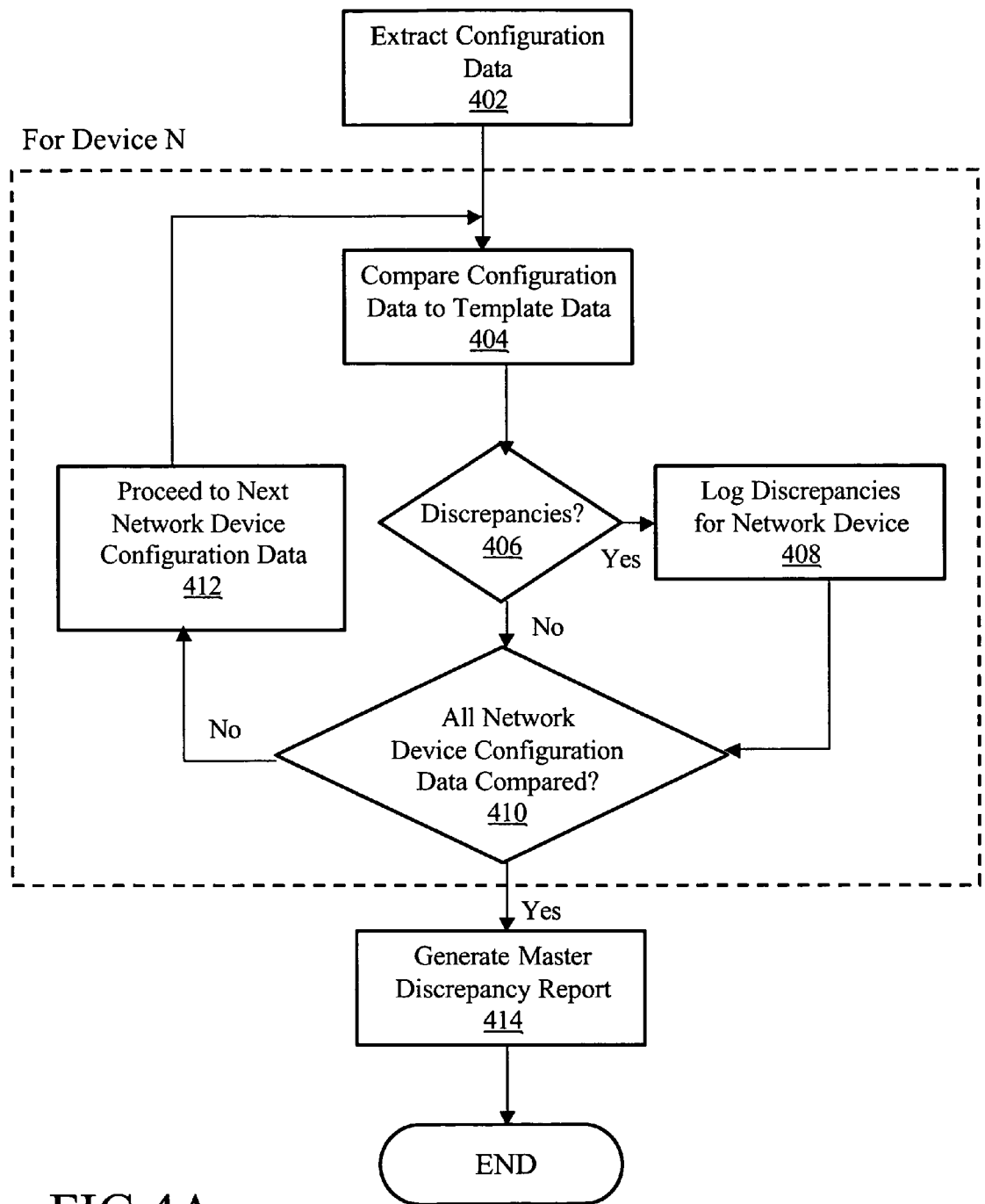
FIGS. 4A and 4B are flow chart diagrams illustrating the steps conducted by the processing unit of FIG. 1 according to first and second embodiments of the present invention.

FIG. 4A is a flow chart illustrating the steps for network configuration logic conducted by the processing unit 102 of FIG. 1 according to a first embodiment of the present invention. Firstly, at step 402, configuration data for a plurality of network devices is extracted. This extraction can take place through any data pull operation such as a publicly available software program entitled "Expect", a UNIX based toolbox based upon Tool Command Language (Tcl) available for download at the SourceForge.net website: http://sourceforge.net/projects/expect. Alternatively, the extraction could occur with a telnet command such as "show config", with the results for all of the network devices within a network being logged to a text file.

As shown at step 404, the processing unit 102 subsequently, for each router N, compares the configuration data to template data; in some embodiments this template data comprising the template files 308 and template resource files 310. This comparison is a dynamic comparison based upon the utilization of the particular network device as will be described herein below in detail with reference to FIG. 5. The results of this dynamic comparison are potentially a set of discrepancies between the actual configuration data and the dynamically adjusted template data for this particular network device (dynamically adjusted potentially based upon the position, model and services of the particular network device). If, at step 406, at least one discrepancy is located at step 404, the details of the discrepancy(s) are logged for router N at step 408.

If no discrepancies are located at step 404 or after the logging of the discrepancy(s) at step 408, the logic running on the processing unit 102 proceeds to determine if all configuration data for each network device have been compared at step 410. In the case that network device list 304 is utilized, step 410 could include determining if all of the network devices within the list have had their respective configuration data compared. Alternatively, if no device list is utilized, step 410 could comprise determining if all of extracted configuration data corresponding to the network devices of the network have been compared at step 404. If additional comparisons are required, the processing unit 102 proceeds at step 412 to the next network device's configuration data for comparison.

Once all of the configuration data has been compared to the template data, the processing unit, according to the embodiment of FIG. 4A, proceeds to generate a master discrepancy report at step 414 based upon the logs of discrepancies that were generated at step 408. This master discrepancy report can be displayed on the computer 108 of FIG. 1 or could be printed so that a list of actionable corrections could be made for network technicians to improve the network configurations within the network.

An example using a sample format for the master discrepancy report is as follows:

```
----------------------------------------
Template >> vpne 7500-system
----------------------------------------
[service timestamps]
 -service timestamps debug datetime msec localtime show-timezone
    dis6-torontodc
 -service timestamps log datetime msec localtime show-timezone
    dis6-torontodc
 +service timestamps debug uptime
    dis6-torontodc
```

In this example, the timestamp configuration for a router called dis 6-torontodc are being validated with use of a template called vpne 7500-system. In this case, dis 6-torontodc is a distribution router with model number 7500 and a VPNE service. The "-"symbol prior to the first two lines of the report indicate that these two lines are missing from the configuration data for router dis 6-torontodc while the "+" symbol prior to the third line of the report indicates that this line is included in the configuration data but should be removed.

Figure 4B:
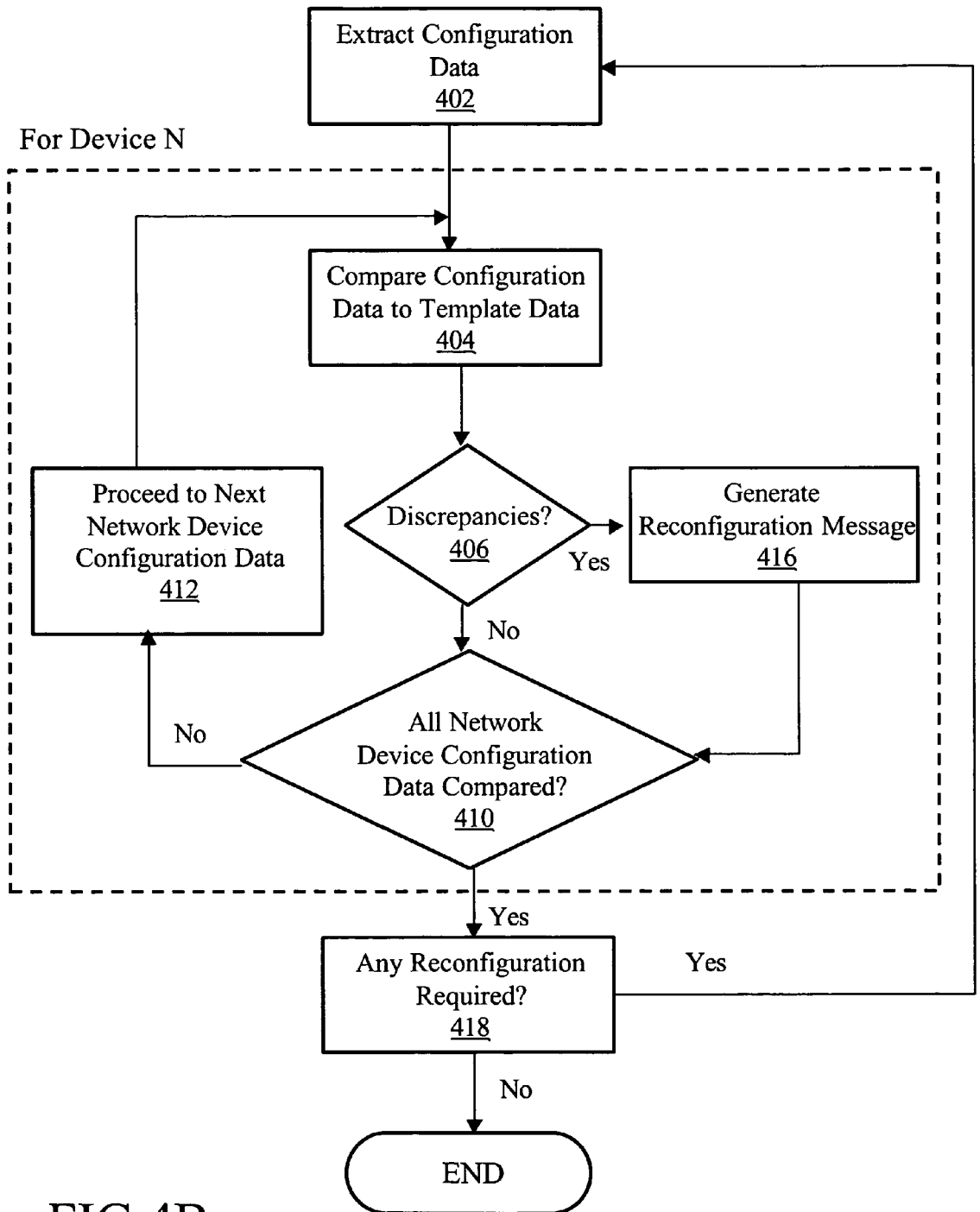

FIG. 4B is a flow chart illustrating the steps conducted by the processing unit 102 of FIG. 1 according to a second embodiment of the present invention. In this implementation, the steps of FIG. 4A are the same but rather than logging the discrepancies, the processing unit 102 generates reconfiguration messages for the particular network device with the discrepancy at step 416. These reconfiguration messages comprise an indication of the router to be reconfigured and the command line to be removed, added or modified. The reconfiguration message automates the work that the network technician would have to conduct after the master discrepancy report was generated in the embodiment of FIG. 4A. In one embodiment, the reconfiguration messages are sent to a server that stores all of the configuration data for the network devices within the network. These reconfiguration messages are utilized to adjust the configuration data within the server and, subsequently, each of the network devices conducts a file transfer to replace the previous configuration data with the modified configuration data.

A further difference from FIG. 4A, is that after all comparisons are complete at step 410, rather than generate a master discrepancy report, the processing unit 102 determines if any reconfiguration messages were required at step 418. If no reconfiguration messages were required, the processing unit concludes the configurations are correct. If a reconfiguration message was required, the processing unit 102 returns to the start of the process to ensure the reconfiguration has subsequently "fixed" the discrepancy. This validation of the reconfiguration could be removed from this embodiment or limited to only those network devices that required a reconfiguration message. Hence, if only a select few network devices within a network required a reconfiguration message, only the configuration data of those select network devices would be extracted at step 402 or alternatively only those select network devices would be listed within the network device list for the validation.

One should understand, although not shown in FIG. 4B, any required reconfiguration messages could be sent in many forms, including within a master reconfiguration message that is transmitted throughout the network. In this case, each required reconfiguration would be listed with a network device identifier (such as the router name or device IP address) of the appropriate network device to be reconfigured. Further, the reconfiguration messages could simply be transmitted simultaneously at the completion of the entire comparison process.

Figure 5:
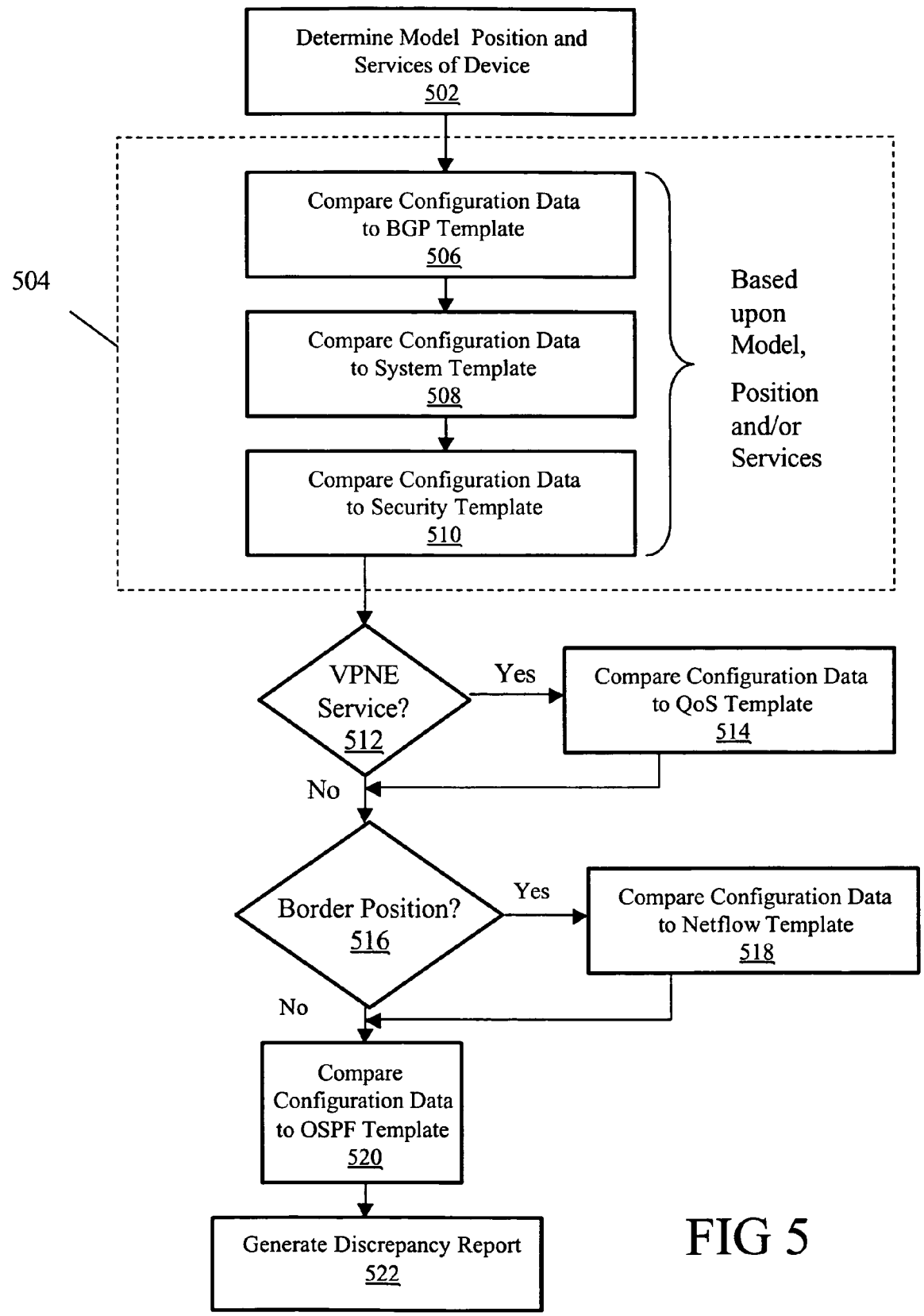
FIG. 5 is a flow chart illustrating the steps conducted by the processing unit of FIG. 1 when performing the comparison step of FIGS. 4A and 4B according to one embodiment of the present invention.

FIG. 5 is a flow chart illustrating the steps conducted by the processing unit 102 of FIG. 1 when performing the comparison step 404 of FIGS. 4A and 4B according to one embodiment of the present invention. As shown in FIG. 5, firstly the processing unit 102 determines, at step 502, the model of the network device, the position of the network device within the network and the services running on the network device. This determination could be conducted in a number of manners. Firstly, if a consistent naming convention is utilized within the network, the name of the network device could be used to indicate the position of the network component within the network or possibly even the model and/or services. In one example, the name of the network devices could have different extensions depending upon whether the device was a border device, a core device or a distribution device.

Another technique for performing step 502 is to conduct a look-up of an internal Internet Protocol (IP) asset database system (which could also be known as a network device database). Action Request System (ARS) produced by Remedy Corporation of Sunnyvale, Calif. is a product available which can be programmed to operate as an IP asset database which would allow queries on specific router data information such as position, services and model; although ARS is not specifically designed for such purpose. In one embodiment, the ARS, when queried, indicates the model of the network device and could further indicate the services being run within the network device. The ARS in other embodiments is extended to also include the position of the network device within the network as standard elements for look-up.

Yet another technique for performing step 502 is to have processing unit 102 analyse the configuration data extracted from the particular network device. In this technique for instance, specific commands unique to a particular service are monitored for. For example, there are unique ISDN commands that indicate a dial-up service is available on a particular network device. Another example is for the processing unit 102 to search for VPN Routing/Forwarding commands which would identify a network device with VPNE service being run. Yet further examples could be contemplated for identifying the position of the network devices. For instance, a network device including a routemap containing neighbours from an outside network would clearly be a border network device.

It should be understood that each of these techniques is not necessarily operated in isolation and further techniques for identifying a network devices model, position and service(s) could be used based upon the protocols and standard operating procedures of the network service provider. In some embodiments of the present invention for instance a combination of all of the above techniques are used to identify the utilization characteristics of the network device and verify the accuracy of this information. One verification technique for instance could be to have a specific service, such as HSE, only operate on specific models of network devices or no services to be operated on a particular position of device, such as core network devices.

Further, it should be understood that although step 502 is specific to determining the model, position and services of the network device, this should not limit the scope of the present invention. Other utilization characteristics could be identified at this step and used in subsequent steps to dynamically adapt the comparison between the configuration data and the template data. Alternatively, not all of these characteristics could potentially be utilized.

Subsequent to step 502, the processing unit proceeds to dynamically compare at step 504 the configuration data of the network device with primary template data based upon the utilization characteristics of the network device, including potentially the model, position and/or services being supported. In one embodiment of the present invention as depicted in FIG. 5, this primary comparison can be broken down into a comparison of the configuration data to the BGP template data at step 506, to the system template data at step 508 and to the security template data at step 510.

The comparison of configuration data to BGP template data at step 506 comprises a series of validations based on dynamic logic as will now be described through the configuration data example below.

Router BGP 123
    neighbour 1.1.1.2 remote AS 123 routemap IBGP-out
    neighbour 1.1.2.1 remote AS 345 routemap IBGP-out In this example, the processing unit 102 ensures for each local neighbour (that is neighbours within its Autonomous System (AS)) that there is a routemap and that this routemap follows the correct naming convention for the company. In the example above, it can be seen that the first neighbour is a local neighbour while the second neighbour is not. It should be understood that there could be large numbers of neighbours.

Further, the processing unit 102 ensures that each routemap for each local neighbour exists within the network device configuration data and yet further checks the integrity of the routemap in the configuration data. Determining the integrity of the routemap is completed by validating the components of the routemap including Access lists, IP Community lists and Prefix lists. For each of these sets of lists within each routemap, the processing unit 102 ensures that the list exists within the configuration data of the network device. Further, the processing unit 102 ensures that the list within the configuration data follows the rules set-up by the company operating the network. For instance, the IP access may not allow private IP space (ex. 10.0.0.0→10.255.255.255; 172.16.0.0→172.31.255.255; 192.168.0.0→192.168.255.255) to be accessed and therefore IP addresses from private IP space would not be permitted on any Access lists. It should be understood that the above routemap validation is only one embodiment. In other embodiments, the routemap, access lists, IP community lists and/or prefix lists could be compared to preset routemaps or lists set-up in the template resource files 310 defined by a set of rules to be applied depending upon the services or customers of the network device being reviewed. It should be understood that the present invention is not limited in scope by the sample neighbour list structure and format described above. Other formats for neighbour lists and routemaps could be contemplated.

Within some embodiments of the present invention, there are additional validations that are required based upon the utilization of the network device in which the processing unit 102 detects. For instance, there could be minimum numbers of neighbours allowed for network devices of a particular position. In particular, border network devices may be forced to have a minimum of two or three local neighbours to ensure proper redundancy in case of a problem. In this case, there could be a further validation that the redundant links are to neighbours within different physical locations. This type of validation is particularly important when checking that corporate policies are being applied correctly by the network technicians.

Referring to FIG. 2A for example, router 211 is depicted as having three local neighbours; two with core routers 208,210 and one with border router 212. If human error resulted in two of these neighbours not being configured within the router 211, a discrepancy would occur since router 211 would have insufficient protection (not the required two links). Further, even if two local neighbours were configured properly such as with router 208 and route 212, if either of these routers were physically located with router 211 or if routers 208 and 212 were physically located together, a discrepancy would be recorded.

The comparison of the configuration data to the system template data at step 508, according to many embodiments, is based upon the model of the network device, the service(s) being run on the network device and potentially the position of the network device as detected by the processing unit 102. Some items that are validated in various embodiments of the present invention using the system template data include ensuring:

1. The Network Time Protocol (NTP) configuration exists for the router clock;
2. Any Access lists within the configuration data exist and correctly abide by all corporate rules and policies;
3. Logging configuration commands have correct logging servers indicated;
4. The Domain Name Server (DNS) configuration is resolved properly between domain names and host names;
5. The boot system exists and has proper integrity;
6. Clock configuration and time zone information is correct for the location of the network device (potentially retrieving the location of the network device from the naming convention of the device or through the ARS system described above);

7. Private IP space is not accessible through the network device via Access lists; and
8. The Simple Network Management Protocol (SNMP) configuration has an Access list applied to it which is configured correctly.

It should be understood that the above list is meant only as a list of examples and not as a comprehensive list of items that the system template data could validate within the configuration data of a network device. The system template data could include one or more of these items and/or could comprise other items not shown.

The comparison of the configuration data to the security template data at step 510, according to many embodiments of the present invention, is based upon the model of the network device, as well as potentially the position and services being supported by the network device. For instance, in the case that the network device is a border device, one additional validation within the security template data is to validate the IP community lists within the routemap abides by all security rules. These security rules could be based upon a per customer basis. Finding discrepancies in the IP community lists is particularly important to ensure that border network elements have the most up-to-date and accurate limitations being applied. A further security template validation required is to validate the Terminal Access Controller Access Control System (TACACS) configuration and Access list.

Further, the dynamic adjustment of the comparisons based upon the utilization of the network device further allows very unique network service provider policies to be reflected for particular services. For instance, one concern with network devices supporting HSE connections is that a hacker could gain access to the network by setting up an authorized account, but the network service provider might not detect the breach since it is assumed that the unauthorized account is simply another ISDN account. To overcome this, in some embodiments of the present invention, the security template data adds an additional validation for HSE enabled network devices. In this case, the processing unit 102 monitors for the number of usernames on the network device and subtracts the number of ISDN account on the device. If the result is greater than the allowable number of administrative usernames (for example, in one embodiment three), a discrepancy is detected and logged. In FIG. 2A, this particular security condition would be verified on Routers 203, 205 and 206; those with ISDN services being supported.

After the primary comparisons at step 504, the processing unit 102 proceeds to compare the configuration data to specifically targeted templates based upon the network devices utilization. At step 512, if the network device supports a VPNE service, the configuration data is compared to a QoS template at step 514. The QoS template utilized in this case is further determined based upon the media speed of the network device (for example OC3, OC48, OC192, etc.) which can be detected from the interface information within the configuration data. In one example, only VPNE service interfaces have QoS operations running and therefore the QoS validation would only be required on routers 201, 204, 206 and 212 within FIG. 2A. It should be understood that other criteria based upon the utilization of the network device could dictate the need for validation of the configuration data with the QoS template.

Next, at step 516, the processing unit 102 determines whether the network device being compared to template data is being utilized as a border network device. In this specific implementation, only border network devices require Net Flow and therefore, only border network devices require their configuration data to be compared to the netflow template data at step 518. In this implementation, within FIG. 2A, routers 211 and 212 would require netflow validation. In other implementations, Net Flow could be required by a set of network devices based upon a different utilization.

At step 520, the processing unit 102 compares the configuration data with the OSPF template. In one embodiment, all interfaces not connected to customers or other Internet Service Providers (ISP) are validated to ensure the OSPF portion of the software code is correct. Therefore, in many embodiments, all interfaces for core routers are validated for OSPF while all inward facing interfaces within border and distribution routers are also validated.

At the end of the flow chart of FIG. 5, the results from all comparisons with all templates are combined into a discrepancy report, at step 522, in which all discrepancies that were identified are logged. It should be understood by one skilled in the art that although described as six different sets of template data, these could be combined or further divided in different groupings of validation templates.

Some advantages of the validation systems according to an embodiment of the present invention can be highlighted with reference to FIGS. 2A and 2B. In FIG. 2B, routers 205 and 206 have been removed from network 110 and border routers 213 and 214 have been added to form new network 110a. Further, router 202 has changed its service from the HSE service to the VPNE service.

In this case, through validation of the configuration data of routers 209 and 210, it can be confirmed that no dead-end open connections are still configured for previous routers 205 and 206 and all routemaps and IP community lists have been appropriately updated. Further, it can be validated that all routers previously coupled to these removed routers still abide by all corporate rules such as redundancy requirements. With the addition of routers 213 and 214 within network 110a, the validation system according to an embodiment of the present invention can ensure that the configuration data for each of these new routers was entered correctly and that all configuration data abides by the required conditions for their utilization (set of services and position within the network) and model. Further, the validation system ensures that the other routers coupled to the new routers are configured properly. Finally, if the validation system of an embodiment of the present invention detects a service change, such as router 202 changing from supporting HSE service to VPNE service (or alternatively a service being terminated or added to a router), the validation system ensures that all proper conditions have been validated. For instance, in the change of service in router 202, it could be required that the QoS template be validated for any router supporting VPNE service. Therefore, the validation system would determine if the QoS component was added to the configuration data of router 202 and whether it was properly configured. It should be understood that there are numerous other examples of benefits for validating the configuration data of a set of routers and the above described examples should not limit the scope of the present invention.

Persons skilled in the art will appreciate that there are yet more alternatives implementations and modifications possible for implementing the present invention, and that the above implementation is only an illustration of this embodiment of the invention. The scope of the invention, therefore, is only to be limited by the claims appended hereto.

We claim:

1. An apparatus for validation of network device configuration data within a network, the apparatus comprising:

a first interface operable to receive configuration data from a plurality of network devices within the network;

a processing unit operable to validate the configuration data for each of the network devices by comparing the configuration data to template data, the template data being set dynamically, based upon a utilization of the network device and at least one characteristic of the network device other than said utilization; and a second interface operable to output the results of the processing unit.

2. An apparatus according to claim 1, further comprising a memory unit operable to store the template data.

3. An apparatus according to claim 1, wherein to receive the configuration data from the plurality of network devices, the first interface is operable to extract the configuration data from the plurality of network devices.

4. An apparatus according to claim 1, wherein so receive the configuration data from the plurality of network devices, the first interface is operable to retrieve from memory the configuration data for the plurality of network devices.

5. An apparatus according to claim 1, wherein the processing unit is operable to extract information from a network device database to detect at least one of data related to the utilization of the network device and the at least one characteristic of the network device.

6. An apparatus according to claim 1, wherein the processing unit is operable to analyse the configuration data of the network device to detect at least one of data related to the utilization of the network device and the at least one characteristic of the network device.

7. An apparatus according to claim 1, wherein the utilization of the network device further comprises at least one of a set of services being an on the network device and a position of the network device in the network.

8. An apparatus according to claim 7, wherein the set of services for at least one network device comprises one of no services and at least one of a Virtual Private Network (VPN) service, a dialup Internet service and a high speed Internet service.

9. An apparatus according to claim 7, wherein the position of the network device comprises one or a border position, a core position and a distribution position.

10. An apparatus according to claim 1, wherein the at least one characteristic is a model identifier of the network device.

11. An apparatus according to claim 1, wherein the template data comprises a set of rules for neighbour lists defined base upon the utilization of the network device.

12. An apparatus according to claim 11, wherein the set of rules for neighbour lists comprises a requirement to validate each of a set of at least one route map associated with an entry within one of the neighbour lists.

13. An apparatus according to claim 12, wherein the requirement to validate a particular route map comprises a requirement to validate at least one of an Internet Protocol (IP) community list, Access list and Prefix list within the particular route map using rules based upon the utilization of the network device.

14. An apparatus according to claim 13, wherein the utilization of the network device comprises the position of the network device in the network.

15. An apparatus according to claim 1, wherein the utilization action of the network device further comprises a set of services being run on the network device; and wherein, if the set of services comprises a dial-up service, the template data comprises a requirement that a number of login credentials for the network device not exceed a sum of a number of customer accounts on the network device and a preset number of administrative access accounts for the network device.

16. An apparatus according to claim 1, wherein the utilization of the network device further comprises a set of services being run on the network device; and wherein, if the set of services comprises a VPN service, the template data comprises a requirement that a Quality of Service component within the configuration data of the network device be validated.

17. An apparatus according to claim 1, wherein the utilization of the network device comprises the position of the network device in the network; and wherein, if the position of the network device comprises a border position, the template data comprises a requirement that a Netflow component within the configuration data of the network device he validated.

18. An apparatus according to claim 1, wherein the template data comprises a requirement that an Open Shortest Path First component within the configuration data of the network device be validated for all interfaces of the network device coupled to another network device within the network.

19. An apparatus according to claim 1, wherein the second interface comprises a discrepancy report interface operable to generate a report of discrepancies in the configuration data of the network devices located by the processing unit during the validation of the configuration data.

20. An apparatus according to claim 1, wherein the second interface comprises a discrepancy repair interface operable to send one or more reconfiguration commands to one or more of the network devices in order to correct discrepancies in the configuration data of the network devices located by the processing unit during the validation of the configuration data.

21. An apparatus according to claim 20, wherein, after the discrepancy repair interface sends the one or more reconfiguration commands, the processing unit is further operable to re-validate the configuration data for at least one of the network devices by comparing the configuration data to template data, the template data being set dynamically, based upon the utilization of said at least one network device and said at least one characteristic of said at least one network device.

22. An apparatus according to claim 1, wherein the processing unit comprises one or more physical components.

23. A method for validating network device configuration data within a network, the method comprising:

receiving configuration data from a plurality of network devices within a the network validating the configuration data for each of the network devices by comparing the configuration data to template data, the template data being set dynamically, based upon a utilization of the network device and at least one characteristic of the network device other than said utilization; and outputting the results of the step of validating the configuration data.

24. A method according to claim 23, wherein the receiving configuration data from a plurality of network devices comprises extracting the configuration data from the plurality of network devices.

25. A method according to claim 23, wherein the receiving configuration data from a plurality of network devices comprises retrieving from memory the configuration data for the plurality of network devices.

26. A method according to claim 23, wherein, prior to validating the configuration data for each of the network devices, the method further comprises extracting information from a network device database to detect at least one of data related to the utilization of the network device and the at least one characteristic of the network device.

27. A method according to claim 23, wherein, prior to validating the configuration data for each of the network devices, the method further comprises analysing the configuration data of the network device to detect at least one of data related to the utilization of the network device and the at least one characteristic at the network device.

28. A method according to claim 23, wherein the utilization of the network device further comprises at least one of a set of services being run on the network device and a position of the network device in the network.

29. A method according to claim 23, wherein the at least one characteristic is a model identifier of the network device.

30. A method according to claim 23, wherein the outputting the results comprises generating a report of discrepancies in the configuration data of the network devices located during the validation of the configuration data.

31. A method according to claim 23, wherein the outputting the results comprises sending one or more reconfiguration commands to one or more of the network devices in order to correct discrepancies in the configuration data of the network devices located during the validation of the configuration data.

32. A method according to claim 31 further comprising, after the sending one or more reconfiguration commands, re-validating the configuration data for at least one of the network devices by comparing the configuration data to template data, the template data being set dynamically, based upon the utilization of said at least one network device and said at least one characteristic of said at least one network device.

33. A configuration validation system operable to be coupled to a plurality of interconnected network devices, each network device comprising corresponding configuration data, the system comprising;
  configuration validation logic operable to validate the configuration data for each of the network devices by comparing the configuration data to template data, the template data being set dynamically, based upon a utilization of the network device and at least one characteristic of the network device other than said utilization; and
  outputting logic operable to output the results of the configuration validation logic.

34. An apparatus comprising:
  means for receiving configuration data from a plurality of network devices within the network;
  means for validating configuration data for each of the network devices by comparing the configuration data to template data, the template data being set dynamically, based upon a utilization of the network device and at least one characteristic of the network device other than said utilization; and
  means for outputting the results of the means for validating.

* * * * *